US010247825B2

(12) United States Patent
Suzuki et al.

(10) Patent No.: US 10,247,825 B2
(45) Date of Patent: Apr. 2, 2019

(54) OBJECT DETECTION DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuru Suzuki, Kariya (JP); Keiko Akiyama, Kariya (JP); Motonari Ohbayashi, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 149 days.

(21) Appl. No.: 15/519,809

(22) PCT Filed: Oct. 21, 2015

(86) PCT No.: PCT/JP2015/005300
§ 371 (c)(1),
(2) Date: Apr. 17, 2017

(87) PCT Pub. No.: WO2016/063529
PCT Pub. Date: Apr. 28, 2016

(65) Prior Publication Data
US 2017/0242122 A1    Aug. 24, 2017

(30) Foreign Application Priority Data

Oct. 22, 2014  (JP) .................................. 2014-215100

(51) Int. Cl.
*G01S 15/93*    (2006.01)
*B62D 15/02*    (2006.01)
(Continued)

(52) U.S. Cl.
CPC ........ *G01S 15/931* (2013.01); *B60R 21/0134* (2013.01); *B62D 15/029* (2013.01);
(Continued)

(58) Field of Classification Search
CPC .. G01S 17/936; G01S 7/4802; B60R 21/0134
(Continued)

(56) References Cited

U.S. PATENT DOCUMENTS

2005/0093735 A1* 5/2005 Samukawa ............... B60T 7/22
342/70
2008/0119993 A1* 5/2008 Breed .................. B60R 19/205
701/46
(Continued)

FOREIGN PATENT DOCUMENTS

JP   2002-350540 A   12/2002
JP   2010-243459 A   10/2010
(Continued)

*Primary Examiner* — Edward Raymond
(74) *Attorney, Agent, or Firm* — Knobbe, Martens, Olson & Bear, LLP

(57) ABSTRACT

An object detection device equipped at a predetermined height includes a waveform obtaining portion obtaining a wave height value of a reflected wave, a reference value calculation portion calculating a wave height value of a wave reflected from a reference obstacle present at the predetermined height as reference value, a detection value calculation portion calculating a wave height value of a wave reflected from a detection object as detection value, a reference distance calculation portion calculating a reference distance between the reference obstacle and the distance measuring sensor, a detection distance calculation portion calculating a detection distance between the detection object and the distance measuring sensor, a correction portion correcting the reference value and the detection value, and a height calculation portion calculating a height of the detection object relative to the predetermined height
(Continued)

according to a relative comparison result of the corrected reference value and the corrected detection value.

10 Claims, 10 Drawing Sheets

(51) Int. Cl.

| | | |
|---|---|---|
| *G01S 15/08* | (2006.01) | |
| *G08G 1/16* | (2006.01) | |
| *B60R 21/0134* | (2006.01) | |
| *G01S 7/527* | (2006.01) | |
| *G01S 15/46* | (2006.01) | |
| *G01S 15/87* | (2006.01) | |

(52) U.S. Cl.
CPC .............. *G01S 7/527* (2013.01); *G01S 15/08* (2013.01); *G01S 15/46* (2013.01); *G01S 15/87* (2013.01); *G08G 1/165* (2013.01); *G08G 1/168* (2013.01); *G01S 2015/934* (2013.01); *G01S 2015/938* (2013.01)

(58) Field of Classification Search
USPC .......................... 702/159, 150, 155, 182–185
See application file for complete search history.

(56) References Cited

U.S. PATENT DOCUMENTS

| | | |
|---|---|---|
| 2009/0095084 A1 | 4/2009 | Barth et al. |
| 2010/0220550 A1 | 9/2010 | Akiyama et al. |

FOREIGN PATENT DOCUMENTS

| | | |
|---|---|---|
| JP | 2011-252853 A | 12/2011 |
| JP | 2013-124986 A | 6/2013 |
| JP | 2014-74665 A | 4/2014 |
| JP | 2014-101101 A | 6/2014 |

\* cited by examiner

OBJECT DETECTION DEVICE

CROSS REFERENCE TO RELATED APPLICATION

This application is based on Japanese Patent Application No. 2014-215100 filed on Oct. 22, 2014, the disclosure of which is incorporated herein by reference.

TECHNICAL FIELD

The present disclosure relates to an object detection device which detects a nearby object by transmitting a probing wave and receiving a reflected wave from the object.

BACKGROUND ART

Proposals have been made to equip a vehicle with a distance measuring sensor, such as an ultrasonic sensor, and detect an object present near the vehicle, such as a vehicle running ahead, a pedestrian, and an obstacle. Also, proposals have been made to perform various controls to enhance driving safety of a vehicle, for example, to actuate a braking device and give a warning to a driver, by using an object detection result.

When a control to enhance safety of a vehicle is performed, a threshold of a distance to an object near the vehicle needs to be changed according to a height of the object before execution of the control. For example, when a case where a vehicle is parked along a wall is compared with a case where the vehicle is parked along a curb, the vehicle can be parked closer to the curb than to the wall.

An object detection device of above-described type is described in Patent Literature 1. When an object is present on roadside with respect to a curb, the object detection device described in Patent Literature 1 detects presence of a low object, such as the curb, based on a reception time difference between reflected waves respectively reflected from the curb and the object.

PRIOR ART LITERATURE

Patent Literature

Patent Literature 1: JP 2002-350540 A

SUMMARY OF INVENTION

When no object which is higher than a relatively low object, such as a curb, is present at a distance further than the low object, even when the object detection device described in Patent Literature 1 detects the curb, the object detection device is incapable of determining whether the object detected is a curb or a wall. Hence, according to the disclosure of Patent Literature 1, a low object, such as the curb, can be detected only in limited circumstance.

In view of the foregoing difficulties, it is an object of the present disclosure to provide an object detection device capable of appropriately calculating a height of a detection object present near a mobile object.

According to a first aspect of the present disclosure, an object detection device detects an object using a distance measuring sensor equipped at a predetermined height. The object detection device transmits a probing wave toward a periphery and receives a reflected wave of the probing wave as detection information of the object. The object detection device includes a waveform obtaining portion, a reference value calculation portion, a detection value calculation portion, a reference distance calculation portion, a detection distance calculation portion, a correction portion, and a height calculation portion. The waveform obtaining portion obtains a reception time and a wave height value of a wave reflected from the object. The wave height value is defined as a value when a height of the wave reflected from the object reaches a maximum. The reference value calculation portion calculates a wave height value of a wave reflected from a reference obstacle as a reference value by using a wave height value obtained by the waveform obtaining portion. The reference obstacle is present at least at the predetermined height. The detection value calculation portion calculates a wave height value of a wave reflected from a detection object as a detection value by using a wave height value obtained by the waveform obtaining portion. Herein, the detection object is a detection target. The reference distance calculation portion calculates a distance between the reference obstacle and the distance measuring sensor as a reference distance by using a reception time of the wave reflected from the reference obstacle. The reception time of the wave reflected from the reference obstacle is obtained by the waveform obtaining portion. The detection distance calculation portion calculates a distance between the detection object and the distance measuring sensor as a detection distance by using a reception time of the wave reflected from the detection object. The reception time of the wave reflected from the detection object is obtained by the waveform obtaining portion. The correction portion corrects the reference value and the detection value according to an attenuation amount which varies in response to a distance ratio of the reference distance to the detection distance. The height calculation portion calculates a height of the detection object relative to the predetermined height according to a relative comparison result of the reference value, which is corrected by the correction portion, and the detection value, which is corrected by the correction portion.

A wave reflected from an object present at an attachment height of the distance measuring sensor directly returns to the distance measuring sensor without being reflected on a ground or the like. In contrast, a wave reflected from an object located lower than the attachment height of the distance measuring sensor is further reflected on the ground either before or after reflection on the object, and a wave height value may possibly be reduced due to reflection on the ground. The configuration as above pays attention to such a reduction of wave height value. That is, according to the configuration as above, an object present at the attachment height of the distance measuring sensor is used as the reference obstacle and a wave height value of a wave reflected from the reference obstacle is used as the reference value. Then, the detection value which is a wave height value of a detection target is compared with the reference value. In particular, each of the reference value and the detection value is corrected according to a variance in amount of attenuation which depends on a distance ratio between the reference distance and the detection distance. A height of the detection object relative to a predetermined height is calculated according to relative comparison result of the corrected reference value and the corrected detection value.

Since a height of the detection target relative to the reference obstacle is calculated with consideration of an attenuation level difference caused by position variance of the detection target with respect to the distance measuring sensor, the height of the detection target can be detected at a high accuracy.

Generally, a wave height value of a reflected wave varies in response to change in temperature or moisture. According to the configuration as above, a height of the detection object is calculated by comparing detection value corresponding to the detection target with the reference value which is newly obtained in each time detection of the detection target. Hence, change in temperature or moisture does not affect the detection, and a height of the detection object can be calculated more accurately.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
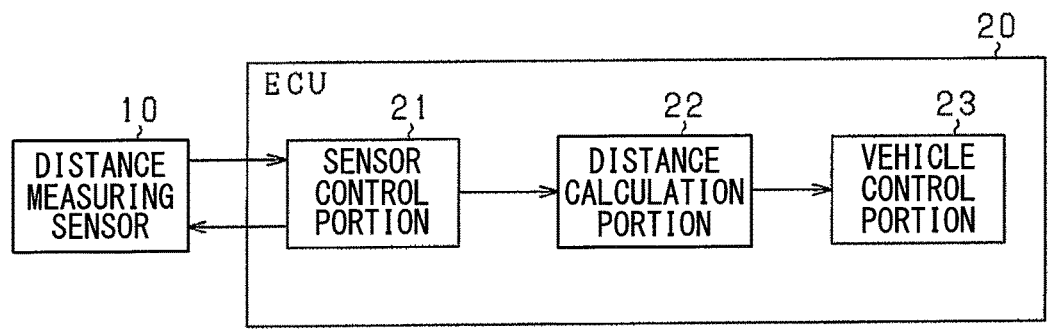
FIG. 1 is a view schematically showing an object detection device according to a first embodiment of the present disclosure.

Hereinafter, respective embodiments will be described according to the drawings. In the drawings, same or equivalent portions are labelled with same reference symbols and a description of portions labelled with same reference symbols is not repeated.

(First Embodiment)

FIG. 1 shows a configuration of an object detection device according to the present embodiment. The object detection device is equipped to a vehicle, and calculates a distance from the vehicle to an object present near the vehicle, such as another vehicle or a road structure. The object detection device includes a distance measuring sensor 10 and an ECU 20 that controls the distance measuring sensor 10.

The distance measuring sensor 10 is provided by, for example, an ultrasonic sensor. The distance measuring sensor is configured to transmit an ultrasonic wave having a frequency of 20 to 100 kHz as a probing wave and receive a probing wave which has reached an object and is reflected from the object as a reflected wave. The ECU 20 includes a microcomputer having a CPU, various memories, an Analog-to-digital converter, and so on. The CPU included in the ECU 20 functions as a sensor control portion 21, a distance calculation portion 22, and a vehicle control portion 23 by running programs preliminarily stored in the memories.

The sensor control portion 21 transmits a control signal to the distance measuring sensor 10 and obtains a wave height value of a reflected wave received by the distance measuring sensor 10. The distance measuring sensor 10 repetitively transmits a probing wave at predetermined intervals (for example, at several milliseconds) for a predetermined time period as a single transmission operation in response to an instruction from the ECU 20. The distance calculation portion 22 calculates a distance between the vehicle and the object from which a reflected wave is received by the distance measuring sensor 10. The vehicle control portion 23 performs, based on a distance to the object near the vehicle calculated by the distance measuring sensor 10, controls on behaviors of the vehicle, such as a steering angle control or an acceleration and deceleration control, and notifies a driver of approaching of the object by activating an alarm.

Figure 2:
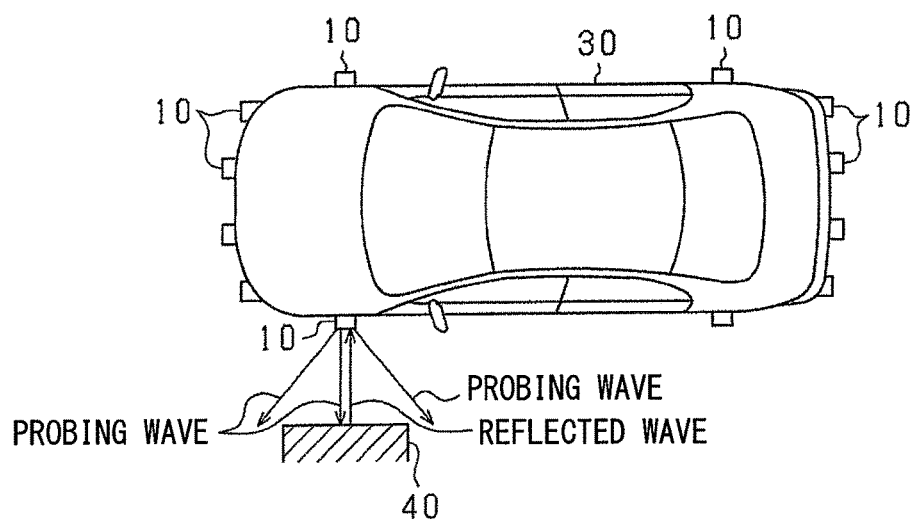
FIG. 2 is a top view of a vehicle equipped with the object detection device.

FIG. 2 is a top view of a vehicle 30 equipped with the object detection device. In the example of FIG. 2, four distance measuring sensors 10 are attached to both front and rear ends of the vehicle 30 at a predetermined interval and two distance measuring sensors 10 are attached to both right and left side surfaces of the vehicle 30 at a predetermined interval. Each of the distance measuring sensors 10 is attached at a predetermined height (about 45 to 60 cm from a ground). The height of 45 to 60 cm from a ground is similar with a height of each bumper mounted at the front and rear ends of the vehicle 30. Probing waves are transmitted radially to a periphery of the vehicle 30 from each distance measuring sensor 10 and some of the probing waves reach a nearby object 40. A probing wave which has reached the object 40 is reflected to the distance measuring sensor 10 as a reflected wave. Attachment positions of the distance measuring sensors 10 to the vehicle 30 shown in FIG. 2 are a mere example, and the attachment positions can be changed in various manners.

Figure 3A:
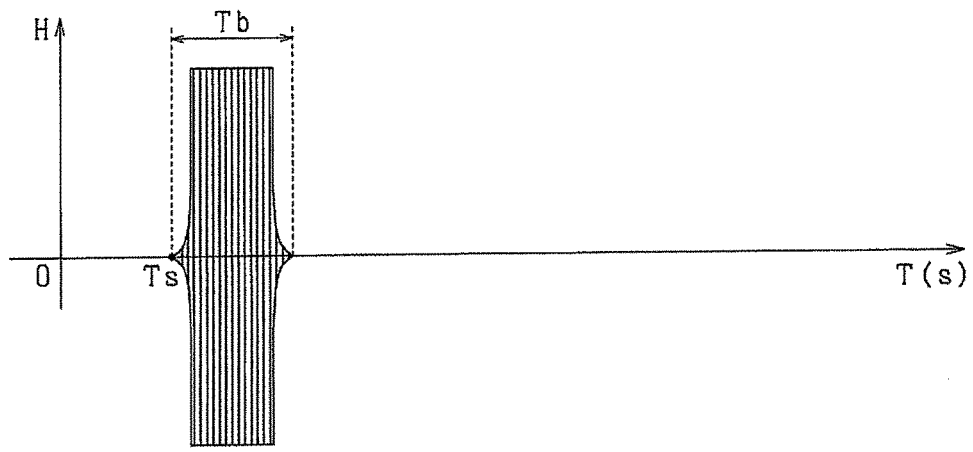
FIG. 3A is a view showing a waveform of a probing wave.
Figure 3B:
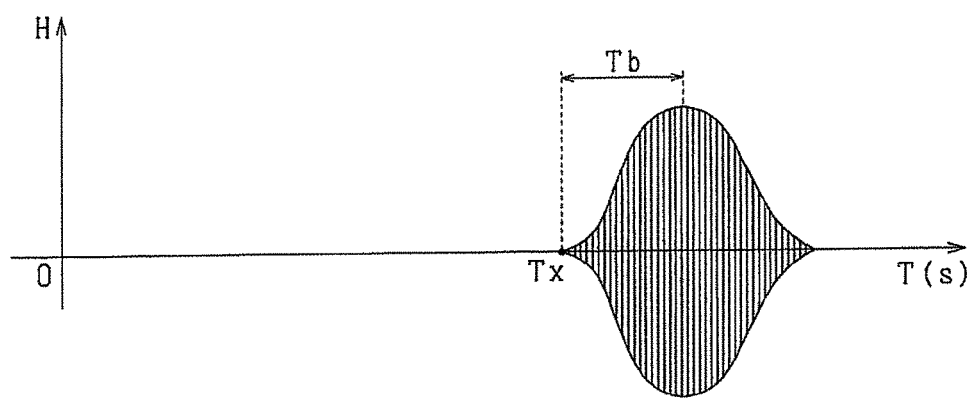
FIG. 3B is a view showing a waveform of a reflected wave.

FIG. 3A shows a waveform of a probing wave, and FIG. 3B shows a waveform of a reflected wave. Herein, a waveform is defined as a shape formed by linking each peak of a wave oscillating within a frequency range of 20 to 100 kHz. Transmission of a probing wave starts at a transmission start time Ts and transmission is continued for a certain transmission time period Tb. A wave height value H of a probing wave starts to increase from the transmission start time Ts. After the wave height reaches a maximum value, the wave height is maintained at the maximum value for a predetermined time. When a predetermined time has elapsed after the wave height reaches the maximum value, the wave height starts to attenuate and the wave height becomes zero when the transmission time period Tb has elapsed from the transmission start time Ts.

A probing wave reaches the object 40 after an elapse of a time period corresponding to a distance between the distance measuring sensor 10 and the object 40. The probing wave which has reached the object 40 is reflected from the object 40 as a reflected wave. The reflected wave reaches the distance measuring sensor 10 after an elapse of a time period corresponding to the distance between the distance measuring sensor 10 and the object 40. The reflected wave takes a peak value after an elapse of a time period equal to the transmission time period Tb of the probing wave from a reception start time Tx of the reflected wave. The distance between the distance measuring sensor 10 and the object 40 is found by converting a difference between the transmission start time Ts of the probing wave and the reception start time Tx of the reflected wave to a distance. The distance between the distance measuring sensor 10 and the object 40 can be calculated by subtracting the transmission start time Ts of the probing wave from the reception start time Tx of the reflected wave, dividing the difference by two, and multiplying the half of the difference by a sound speed.

Figure 4:
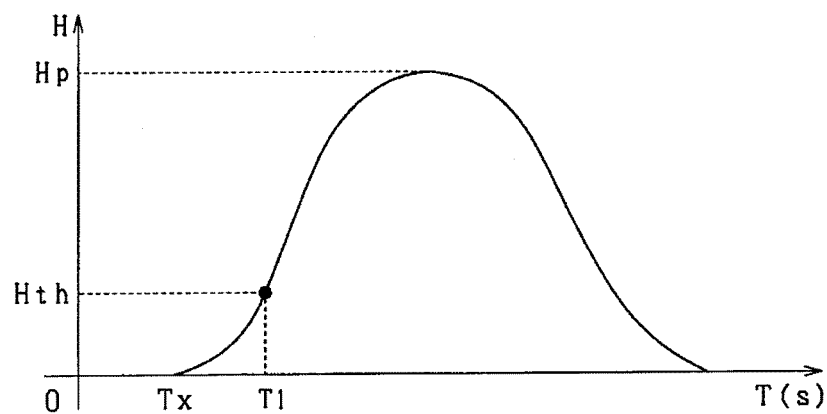
FIG. 4 is a view showing a detailed waveform of a reflected wave.

A method of obtaining parameters of a reflected wave will now be described in detail using FIG. 4. Generally, it is difficult to obtain the reception start time Tx of a reflected wave by obtaining a time when a wave height starts to increase from zero. Hence, a time when a wave height exceeds a threshold Hth (reception time T1) is obtained as the reception start time Tx of a reflected wave. A maximum value of the wave height is obtained after the reception time T1. The process as above can be performed by peak-hold process or the like. The maximum value obtained in the manner as above is used as a wave height value Hp in the process of the present embodiment.

Figure 5A:
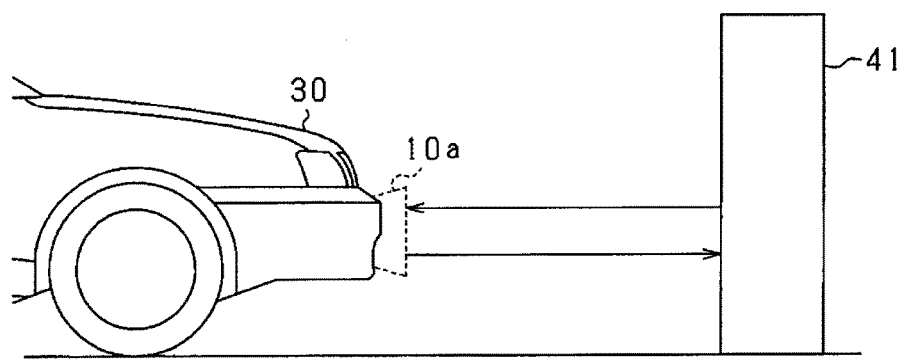
FIG. 5A shows a route of a wave reflected from an object higher than an attachment position of a distance measuring sensor.
Figure 5B:
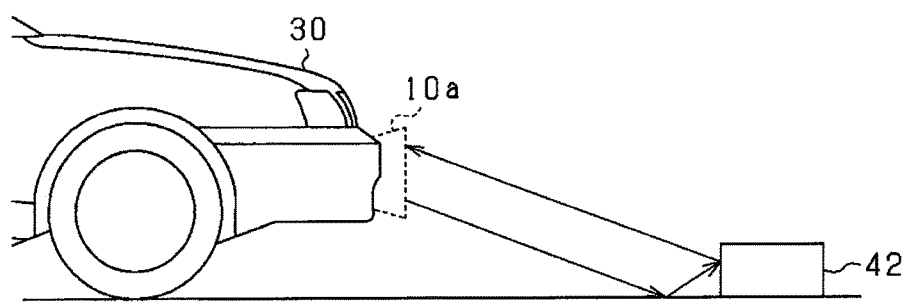
FIG. 5B shows a route of a wave reflected from an object lower than the attachment position of the distance measuring sensor.

The wave height value Hp of a reflected wave attenuates with a propagation distance of the probing wave and the reflected wave. In addition, the wave height value Hp attenuates due to reflection on nearby objects. FIG. 5A shows a case where a probing wave is reflected from an object 41, such as a wall or another vehicle which is higher than an attachment position of the distance measuring sensor 10. In contrast, FIG. 5B shows a case where a probing wave is reflected from an object 42 which is lower than the attachment position of the distance measuring sensor 10. In FIG. 5A and FIG. 5B, the distance measuring sensor 10 is capable of obtaining a reflected wave reaching a reception range 10a emphasized and indicated by a broken line in each drawing.

As is shown in FIG. 5A, a probing wave is incident at substantially a right angle on the object 41 which is higher than the attachment position of the distance measuring sensor 10. In contrast, as is shown in FIG. 5B, a probing wave is not incident at a right angle on the object 42 which is lower than the attachment position of the distance measuring sensor 10. Hence, some of probing waves transmitted from the distance measuring sensor 10 reach the object 42 after being reflected on the ground. The probing waves are then reflected from the object 42 and reach the distance measuring sensor 10. Meanwhile, some of probing waves transmitted from the distance measuring sensor 10 directly reach the object 42. The probing waves are reflected on the ground as well after being reflected from the object 42 and reach the distance measuring sensor 10.

Hence, a probing wave reflected as a reflected wave from the object 42 relatively lower than a wall, another vehicle, or the like is reflected more than once. A wave height value Hp therefore becomes small in comparison with a wave reflected once from a wall, another vehicle, or the like. Thus, a wall, another vehicle, or the like is defined as a reference obstacle. Then, a height of the object is determined by comparing a wave height value Hp of the reference obstacle and a wave height value Hp of the detected object 42 (detection object) and specifying a height of the object 42 relative to the reference obstacle.

Figure 6:
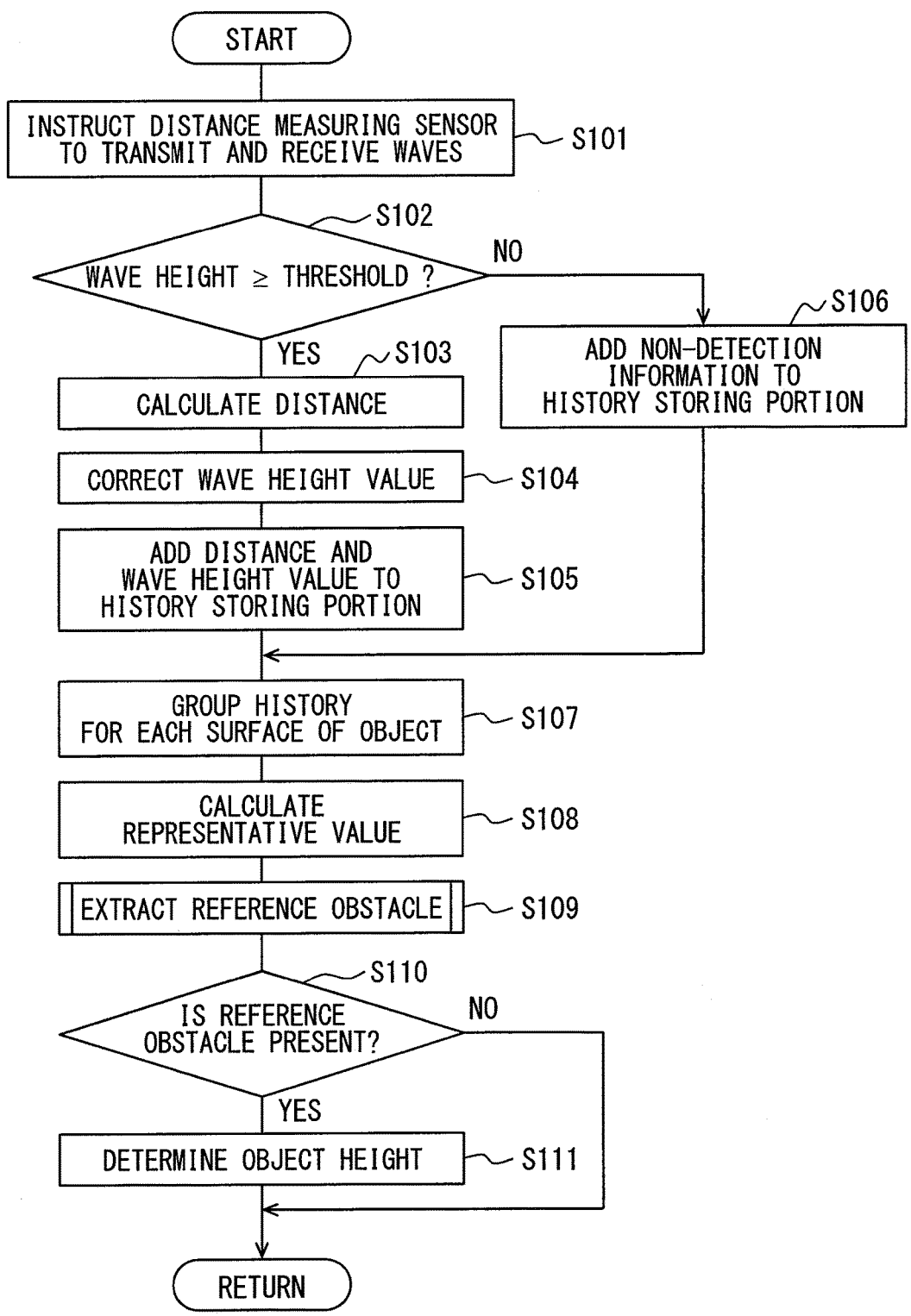
FIG. 6 shows a flowchart depicting a process according to the first embodiment.

FIG. 6 shows a flowchart depicting a series of processing procedures performed by the ECU 20 in the present embodiment. The process of FIG. 6 is performed at a predetermined interval.

Firstly, an instruction to transmit probing waves and receive reflected waves is sent to the distance measuring sensor 10 (S101). When a process in S101 ends, a probing wave is transmitted from the distance measuring sensor 10 and whether a wave height of a reflected wave exceeds the threshold Hth is determined (S102). A process in S102 is repeated in predetermined control cycles until the wave height exceeds the threshold Hth (S102: YES) or a predetermined time elapses (S102: NO).

When the wave height exceeds the threshold Hth (S102: YES), a reception time T1 is obtained and a distance from the distance measuring sensor 10 to an object is calculated (S103). In addition, a wave height value Hp, which is a value when the wave height reaches a maximum, is obtained. During the above process, the ECU 20 functions as a waveform obtaining portion. The calculated distance is referred to as a reference distance in a case where the object is adopted as a reference obstacle, and the ECU 20 functions as a reference distance calculation portion. Meanwhile, the calculated distance is referred to as a detection distance in a case where the object is an object (detection object) to be compared with the reference obstacle, and the ECU 20 also functions as a detection distance calculation portion.

Subsequently, the ECU 20 functions as a correction portion. The ECU 20 corrects the wave height value Hp by multiplying the wave height value Hp by a coefficient corresponding to the calculated distance (the reference distance or the detection distance) (S104). The coefficient used herein is a value to correct an attenuated component of the wave height value Hp. Herein, the attenuation is caused by the distance to the object. The wave height value Hp is corrected to satisfy an assumption that the object is present at a certain distance. That is, the reference value and the detection value are corrected according to a variance in amount of attenuation which depends on a distance ratio of the reference distance to the detection distance. The distance may be corrected in a case where the object is highly likely to be an object which has reflected the reflected wave received before. The corrected distance and the corrected wave height value Hp are stored in a history storing portion provided in a memory of the ECU 20 (5105).

On the other hand, the wave height of the reflected wave fails to exceed the threshold Hth within a predetermined time period (S102: NO), it can be determined that no object on which the probing wave to be reflected is detected. Hence, non-detection information is stored in the history storing portion. Even when a wave height of the reflected wave does not exceed the threshold Hth, a wave reflected from another object of some type is generally present. Hence, the threshold Hth or the threshold Hth corrected with a predetermined correction coefficient may be used as a default value and the default value may be stored in the history storing portion as the wave height value Hp.

Subsequently, the ECU 20 functions as a grouping portion. That is, a history is grouped according to distance stored in the history storing portion (S107). Reflected waves having calculated distances and detected azimuths close to one another are grouped as one set. That is, reflected waves which are highly likely to have been reflected from a same object are grouped as one set. The azimuth of a reflected wave can be identified by specifying which distance measuring sensor 10 has detected the reflected wave.

After the grouping, a representative value of the wave height values Hp is calculated for the grouped history (S108). Regarding a calculation of the representative value, an average value of the wave height values Hp in a same group stored in the history storage portion is calculated and the calculated average value is used as the representative value. The representative value may include a maximum value and a minimum value in the group in addition to the average value. In a case where the maximum value and the minimum value are used, the maximum value and the minimum value may be obtained after values far from the average value are removed using an average value filter or a Gaussian filter.

After the representation value is calculated, process to extract a reference obstacle is performed (S109). The reference obstacle is to be compared with the representative value as a reference. The ECU 20 functions as a detection value calculation portion by executing S108, and functions as a reference value calculation portion by executing S109.

When the reference obstacle is extracted (S110: YES), the ECU 20 functions as a height calculation portion. That is, a ratio or a difference between the representative value and a reference value corresponding to the extracted reference obstacle is calculated. Then, for the object whose representative value has been calculated, a height relative to the reference value is calculated (S111) based on the calculated ratio or difference between the representative value and the reference value, and the reference value that is specified as a height of the reference obstacle. Subsequently, a series of the processing procedures is ended and the ECU 20 stands by until a next transmission operation of probing waves. Meanwhile, when no reference obstacle is extracted (S110: NO), a series of the processing procedures is ended and the ECU 20 stands by until a next transmission operation of probing waves.

Figure 7:
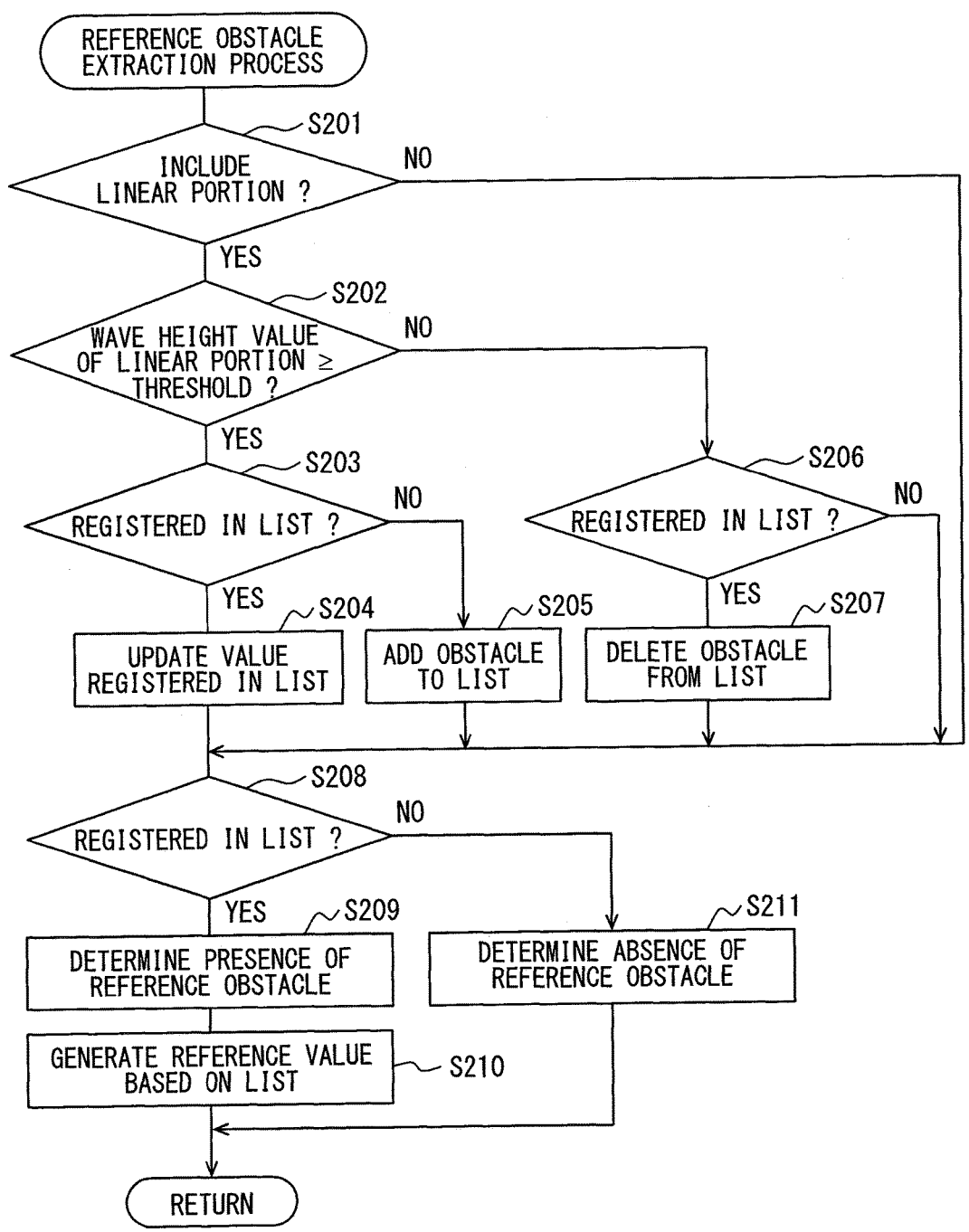
FIG. 7 shows a sub-routine depicting reference obstacle extraction process in the first embodiment.

The reference obstacle extraction process in S109 in the flowchart of FIG. 6 will now be described in detail. Process depicted by the flowchart of FIG. 7 is a sub-routine executed in S109 of FIG. 6.

Firstly, whether the object detected is an object including a linear portion extending in horizontal direction is determined by using the grouped history (S201). A process in S201 is performed by determining whether a variation in distance in each group falls within a predetermined range. A reflection direction of a reflected wave from an object without a linear portion, that is, a reflection direction of a reflected wave from an object having an irregular shape or a curved shape varies, and a wave height value Hp becomes smaller. As has been described, a height of a detection target is calculated by comparing a wave height value Hp of a wave reflected from the reference obstacle and a wave height value Hp of a wave reflected from the detection target. Hence, in a case where an object without a linear portion in horizontal direction is used as the reference obstacle, a calculated height of a comparison object relative to the reference obstacle may be higher than an actual height. Thus, an object having a linear portion is used as the reference obstacle.

When it is determined that the object has a linear portion, whether a wave height value Hp of the linear portion is equal to or larger than a threshold is determined (S202). The threshold is a preliminarily set value and stored in a memory of the ECU 20. When the wave height value Hp is smaller than the threshold, the object has a linear portion but may possibly be an object which absorbs or scatters a probing wave. When the object with such a possibility is used as the reference obstacle, a calculated height of a comparison object relative to the reference obstacle may be higher than an actual height. Meanwhile, when the wave height value Hp is smaller than the threshold Nth, the object has a linear portion but may possibly be an object represented by a curb or a vehicle stopper. When the object is the curb or the vehicle stopper, a reflected wave reaches the distance measuring sensor 10 after being reflected on the ground and the object. Accordingly, when a wave height value Hp of the linear portion is smaller than the threshold, the object is determined to be inappropriate to be set as the reference obstacle.

When a wave height value Hp of the linear portion is larger than the threshold (S202: YES), whether the reference obstacle is registered in a list is determined (S203). The list is used to temporarily store a history extracted as the reference obstacle. The list is stored in a memory of the ECU 20. When it is determined that the reference obstacle has been registered in the list (S203: YES), a value of the wave height value Hp is updated (S204). When it is determined that no reference obstacle is registered in the list (S203: NO), the reference obstacle is added to the list as a new entry (S205).

Meanwhile, when the wave height value Hp of the linear portion is smaller than the threshold (S202: NO), in a case where a reference obstacle has been already registered in the list (S206), the reference obstacle is deleted from the list (S207) because the reference obstacle is inappropriate as a reference obstacle.

When a process in S204, S205, or S207 ends or a negative determination is made in S206, whether the reference obstacle is registered in the list is determined (S208).

When it is determined that the reference obstacle is registered in the list (S208: YES), a determination result informing presence of the reference obstacle is made (S209). An average value of the reference obstacle registered in the list is calculated as the reference value (S210). Then, a series of the processing procedures is ended. Meanwhile, when it is determined that no reference obstacle is registered in the list (S208: NO), a determination result informing absence of the reference obstacle is made (S211). Then, a series of the processing procedures is ended.

Owing to the configuration as above, the object detection device of the present embodiment achieves effects as follows.

A wave reflected from an object present at an attachment height of the distance measuring sensor 10 directly reaches the distance measuring sensor 10 without being reflected on the ground or the like. In contrast, a wave reflected from an object lower than the attachment height of the distance measuring sensor 10 is further reflected on the ground either before or after being reflected from the object, and a wave height value Hp may possibly be reduced due to reflection on the ground. The present embodiment pays attention to such a reduction in wave height value. That is, an object present at an attachment height of the distance measuring sensor 10 is used as the reference obstacle and a wave height value Hp of a reflected wave reflected from the reference obstacle is used as the reference wave height value. By comparing a wave height value Hp of a detection target with the reference wave height value, a height of the detection target relative to the reference obstacle can be calculated with high accuracy.

The wave height value Hp is corrected by multiplying the wave height value Hp by a value corresponding to the calculated distance to make a distance to the reference obstacle equal to a distance to the detection object. Hence, even in a case where a distance between the distance measuring sensor 10 and the reference obstacle is different from a distance between the distance measuring sensor 10 and the object 42 as a detection target, a height of the detection target 42 relative to the reference obstacle can be calculated. Herein, the distance between the distance measuring sensor 10 and the reference obstacle is obtained upon detection of the reference obstacle, and the distance between the distance measuring sensor 10 and the detection target 42 is obtained upon detection of the object 42.

Generally, a wave height value Hp of a reflected wave varies under an influence of temperature and moisture. In the present embodiment, since a height of a detection object is calculated by comparing the reference value and the detection value found in response to each time detection of the object, a height of the detection object can be calculated without being affected by temperature and moisture.

In a case where an object extracted as the reference obstacle has an irregular shape or a curved shape, a reflection direction varies and a wave height value becomes smaller. Hence, when an object having no linear portion is used as the reference obstacle, a calculated height of a comparison object relative to the reference obstacle is higher than an actual height. In the present embodiment, when the reference obstacle is extracted, the reference obstacle is limited to an object disposed at a distance within a predetermined range of variation. Hence, a case where a calculated height of a comparison object relative to the reference obstacle is higher than an actual height can be avoided. Consequently, detection accuracy of an object height can be enhanced.

(Second Embodiment)

An object detection device of the present embodiment has an overall configuration similar to the configuration of the object detection device of the first embodiment. Herein, the process in the first embodiment above is applied to parallel parking of a vehicle 30.

Figure 8A:
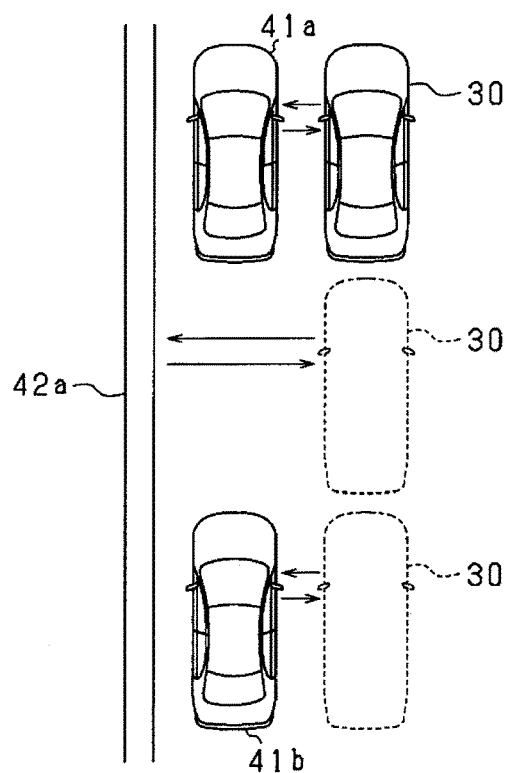
FIG. 8A is a view showing a positional relation among a vehicle, a front vehicle, and a rear vehicle during a starting stage of parallel parking in a second embodiment of the present disclosure.
Figure 8B:
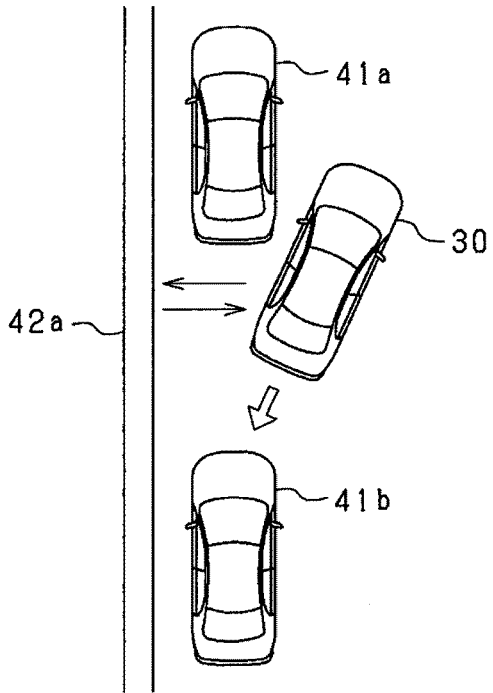
FIG. 8B is a view showing a positional relation among the vehicle, the front vehicle, and the rear vehicle during a parallel parking in the second embodiment.

FIG. 8A and FIG. 8B show a circumstance where process of the present embodiment is applied, that is, when the vehicle 30 is parked along a curb 42a in a space between a front vehicle 41a and a rear vehicle 41b. FIG. 8A shows a positional relation among the vehicle 30, the front vehicle 41a, and the rear vehicle 41b during a starting stage of parallel parking. FIG. 8B shows a positional relation among the vehicle 30, the front vehicle 41a, and the rear vehicle 41b during execution of the parallel parking.

When parallel parking is started, the vehicle 30 passes by a lateral position of the rear vehicle 41b, and also passes by a lateral position of a space between the front vehicle 41a and the rear vehicle 41b, and reaches a lateral position of the front vehicle 41a, and starts to move in reverse direction. A distance between the vehicle 30 and a side surface of the front vehicle 41a and a distance between the vehicle 30 and a side surface of the rear vehicle 41b are obtained by a distance measuring sensor 10. The side surface of the front vehicle 41a and the side surface of the rear vehicle 41b are substantially flat and have linear shapes each extending in a horizontal direction. Hence, the both side surfaces can be suitably used as reference obstacles.

When the vehicle 30 is reversed, a distance between a rear end of the vehicle 30 and the curb 42a is detected by the distance measuring sensor 10. A height of the curb 42a can be estimated by using the side surface of the front vehicle 41a and the side surface of the rear vehicle 41b obtained earlier as the reference obstacles and also by using a wave height value Hp of a wave reflected from the curve 42a.

Figure 9:
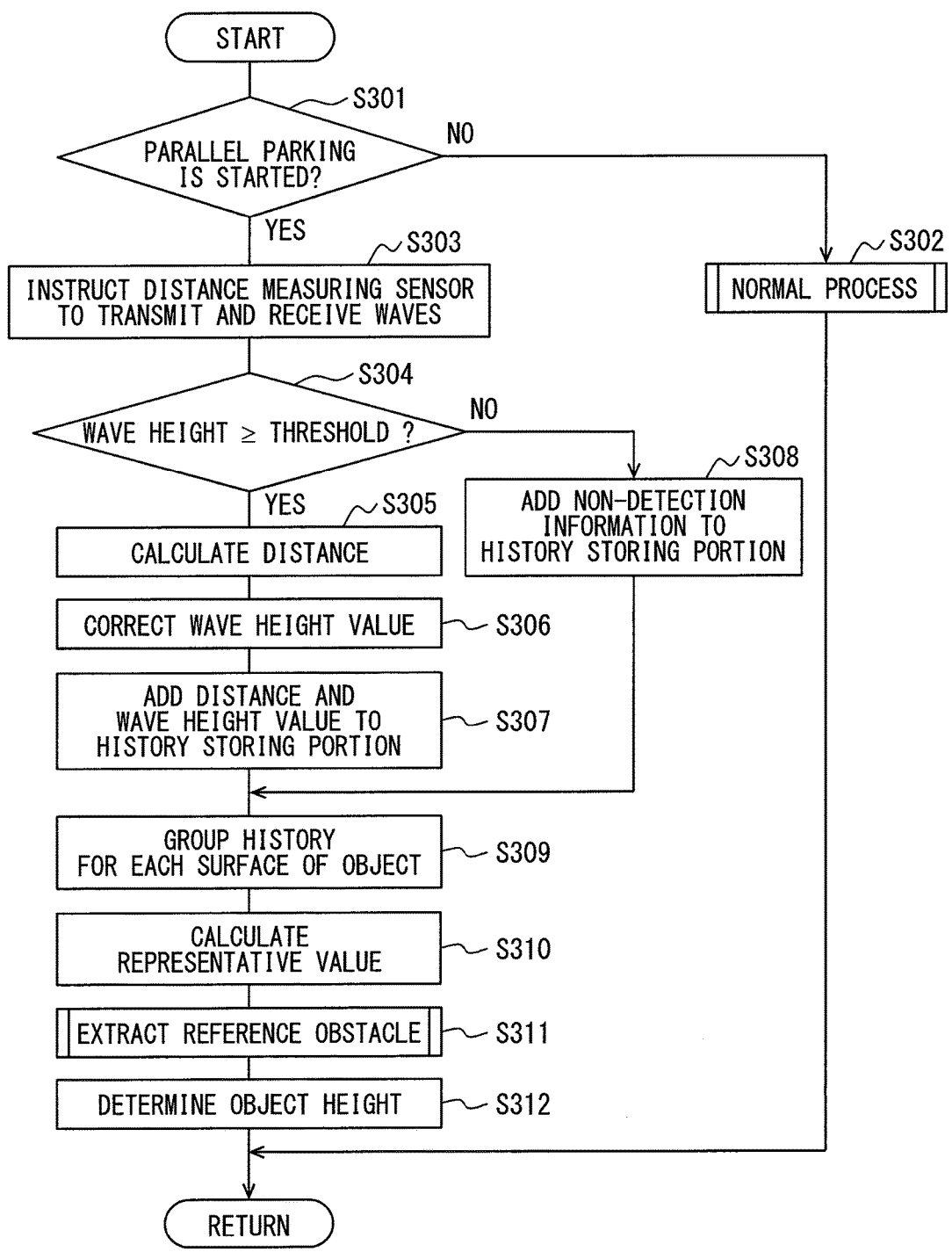
FIG. 9 shows a flowchart depicting a process according to the second embodiment.

FIG. 9 shows a flowchart depicting a series of processing procedures performed by the object detection device of the present embodiment. The process of the present embodiment is partly similar to the process of the first embodiment above. Also, in the present embodiment, the process of the first embodiment above is repetitively performed until parallel parking is started and the process is switched to parallel parking process when parallel parking is started.

Firstly, whether parallel parking is started is determined (S301). Specifically, whether the front vehicle 41a and the rear vehicle 41b parked at a predetermined interval or more are detected at lateral positions of the vehicle 30 is determined, and whether a moving direction of the vehicle 30 is switched from forward to reverse at a lateral position of the front vehicle 41a. When it is determined that parallel parking is not yet started (S301: NO), the process switches to the normal process (S302) which is executed in the first embodiment above, and then the process is ended.

When it is determined that parallel parking is started (S301: YES), processes same as the processes in S101 through S108 of the first embodiment above are performed in S303 through S310, respectively. A wave height value Hp of a reflected wave from the curb 42a or the like, which is positioned inside of a space between the front vehicle 41a and the rear vehicle 41b, is obtained.

Subsequently, reference obstacle extraction process is performed (S311). A process in S311 is performed by executing a sub-routine in accordance with S201 through S210 of the first embodiment above. In this case, the front vehicle 41a and the rear vehicle 41b are selected as reference obstacles. That is, presence of the front vehicle 41a and the rear vehicle 41b is detected in a determination determining whether parallel parking is started in S301. Further, since each of the front vehicle 41a and the rear vehicle 41b has a side surface having a substantially linear shape, both of the front vehicle 41a and the rear vehicle 41b are determined as appropriate objects as reference obstacles. Then, a height of the curb 42a is calculated using the front vehicle 41a and the rear vehicle 41b as the reference obstacles, and a series of the processing procedures is ended.

The above has described a case where the curb 42a is present inside of a space between the front vehicle 41a and the rear vehicle 41b. It should be appreciated that the process of the present embodiment can be performed also in a case where a road structure other than the curb 42a, a wall, or the like is present inside of the space.

In the process described above, a height of the curb 42a is calculated after parallel parking is started. Alternatively, a height of the curb 42a may be calculated before parallel parking is started. Specifically, reflected waves are obtained in order of waves reflected from the rear vehicle 41b, waves reflected from the curb 42a, and waves reflected from the front vehicle 41a while the vehicle 30 is moving forward. Then, and a height of the curb 42a is calculated by using the front vehicle 41a and the rear vehicle 41b as reference obstacles. The front vehicle 41a, the rear vehicle 41b, and a height of the curb 42a obtained in the manner as above are temporarily stored in a memory of the ECU 20. When a moving direction of the vehicle 30 is switched from forward to reverse, the front vehicle 41a, the rear vehicle 41b, and the height of the curb 42a stored in the memory are read out to perform a control based on the height and location of the curb 42a.

With the configuration as above, the object detection device of the present embodiment achieves effects as follows in addition to the effects achieved by the object detection device of the first embodiment above.

When the vehicle 30 is performing a parallel parking, an approachable distance of the vehicle 30 is changed depending on whether it is the curb 42a or a wall that is positioned at an inside portion of the parking space. Hence, by applying the process of the first embodiment above to enable a detection of a height of an object positioned inside of the parking space, an approachable distance to the object positioned inside of the parking space for parallel parking can be set suitably. In addition, a reflected wave from the side surface of the front vehicle 41a and a reflected wave from the side surface of the rear vehicle 41b can be obtained in the case of parallel parking. Because the side surface of the front vehicle 41a and the side surface of the rear vehicle 41b have linear shapes, reflected waves from the side surfaces have values suitable for a calculation of a reference value. Consequently, a height of the curb 42a or the like can be detected more precisely.

(Third Embodiment)

An object detection device of the present embodiment has an overall configuration same as the configuration of the object detection device of the first embodiment above. Herein, the process of the first embodiment above is applied to a perpendicular parking of a vehicle 30.

Figure 10:
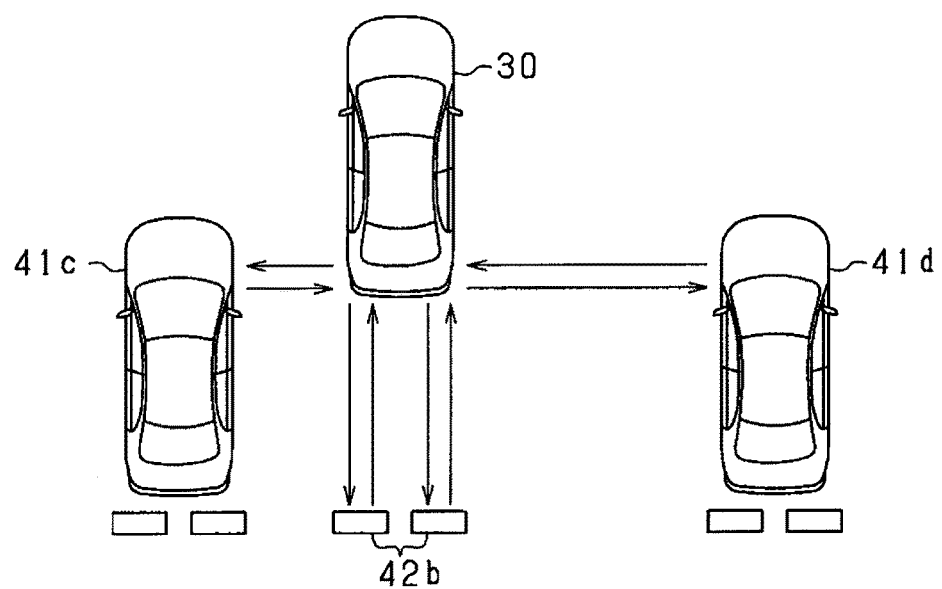
FIG. 10 is a view showing a perpendicular parking in a third embodiment of the present disclosure.

FIG. 10 shows a circumstance where process of the present embodiment is applied, that is, when the vehicle 30 performs a perpendicular parking by reversing the vehicle 30 into a space between a left vehicle 41c and a right vehicle 41d until the vehicle 30 makes contact with a vehicle stopper 42b. Instead of the vehicle stopper 42b, a wall or the like may be disposed at an inside end of the parking space, and the vehicle 30 may be reversed and parked perpendicular to the wall.

When perpendicular parking is started, a side surface of the left vehicle 41c and a side surface of the right vehicle 41d are detected by a distance measuring sensor 10 attached to a side portion of the vehicle 30. A height of the vehicle stopper 42b can be estimated by using the side surface of the left vehicle 41c and the side surface of the right vehicle 41d obtained as above as reference obstacles and by using a wave height value Hp of a wave reflected from a curb 42a.

Figure 11:
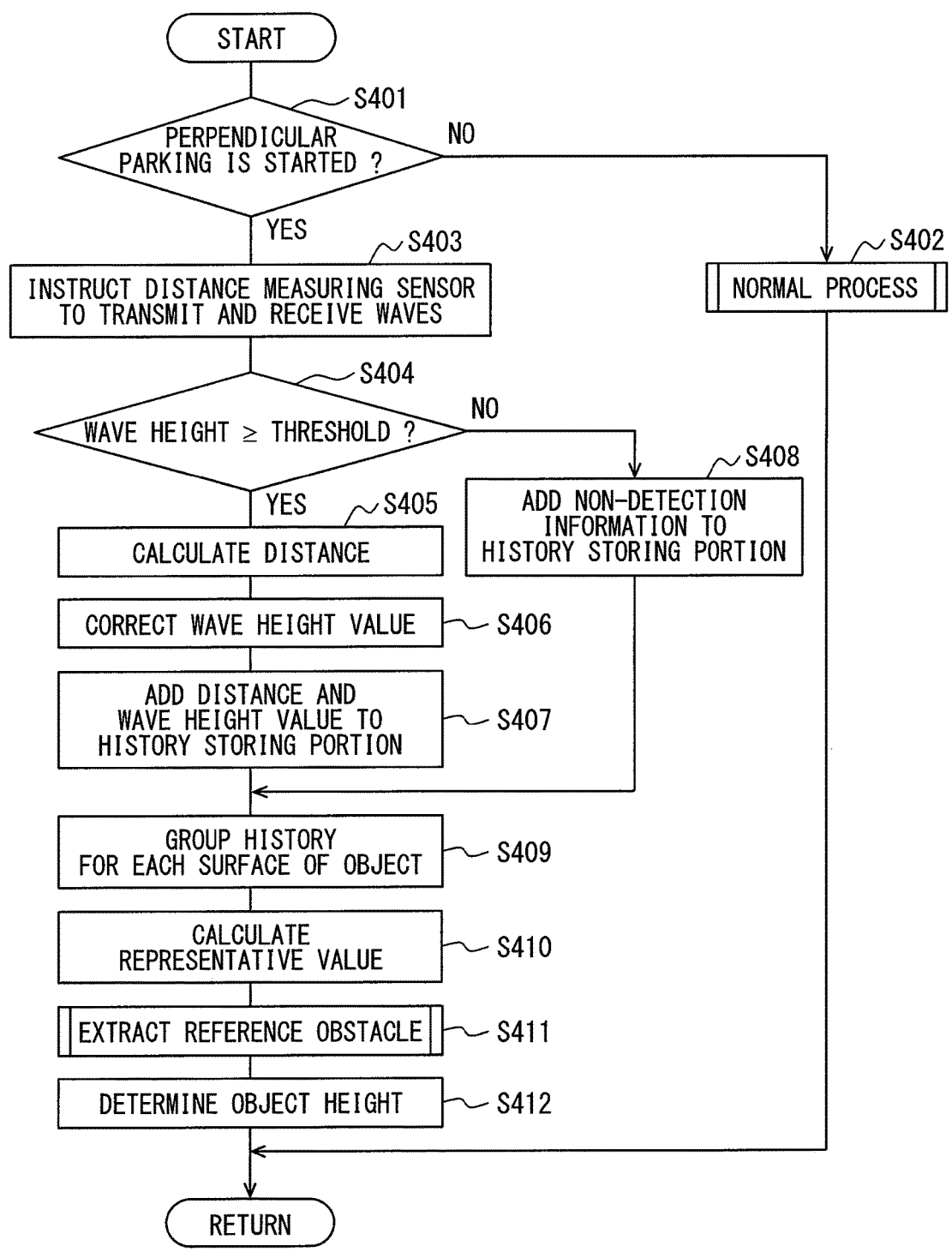
FIG. 11 shows a flowchart depicting a process according to the third embodiment.

FIG. 11 shows a flowchart depicting a series of processing procedures performed by the object detection device of the present embodiment. The process of the present embodiment is partly similar to the process of the first embodiment above. Also, in the present embodiment, the process of the first embodiment above is repetitively performed until perpendicular parking is started and the process is switched to perpendicular parking process when perpendicular parking is started.

Firstly, whether perpendicular parking is started is determined (S401). It is determined that perpendicular parking is started when a control condition of the vehicle 30 is switched to a reverse control and at least one of the left vehicle 41c and the right vehicle 41d is detected. When it is determined that perpendicular parking is not started (S401: NO), the process is switched to normal process (S402) which is the process executed in the first embodiment above, and a series of the processing procedures is ended.

When it is determined that perpendicular parking is started (S401: YES), processes same as the processes in S101 through S108 of the first embodiment above are performed in S403 through S410, respectively. A wave height value Hp of a reflected wave from the vehicle stopper 42b or the like is thus obtained.

Subsequently, reference obstacle extraction process is performed (S411). A process in S411 is performed by executing a sub-routine in accordance with S201 through S210 of the first embodiment above. Because presence of the left vehicle 41c and the right vehicle 41d is already detected when a determination that the perpendicular parking is started in S401 is made and the left vehicle 41c and the right vehicle 41d have side surfaces having substantially linear shapes appropriate for reference obstacles, the left vehicle 41c and the right vehicle 41d are selected as reference obstacles. Same process can be performed even when only the left vehicle 41c or only the right vehicle 41d is detected. A height of the vehicle stopper 42b found by using the left vehicle 41c and the right vehicle 41d as the reference obstacles is calculated, and a series of the processing procedures is ended.

With the configuration as above, the object detection device of the present embodiment achieves effects as follows in addition to the effects achieved by the object detection device of the first embodiment above.

When the vehicle 30 performs perpendicular parking, an approachable distance of the vehicle 30 is changed depending on whether the object present inside of the parking space is the vehicle stopper 42b or a wall. Hence, by applying the process of the first embodiment above to enable a detection of a height of an object present disposed inside of the parking space, an approachable distance to an object at the inside portion of the parking space in perpendicular parking can be set suitably. In addition, a reflected wave from the side surface of the left vehicle 41c and a reflected wave from the side surface of the right vehicle 41d can be obtained in the case of perpendicular parking. Because the side surface of the left vehicle 41c and the side surface of the right vehicle 41d have linear shapes, reflected waves from the side surfaces have values suitable for a calculation of the reference values. Consequently, a height of the vehicle stopper 42b or the like can be detected more precisely.

(Fourth Embodiment)

Each of the object detection devices of the first through third embodiments above obtains a distance to an object disposed at a short range. In some cases, a wave height of a received reflected wave exceeds a detectable maximum value. An object detection device of the present embodiment performs a process to estimate a wave height value Hp when a wave height of a received reflected wave exceeds a detectable maximum value. The ECU 20 functions as a wave height estimation portion.

Figure 12:
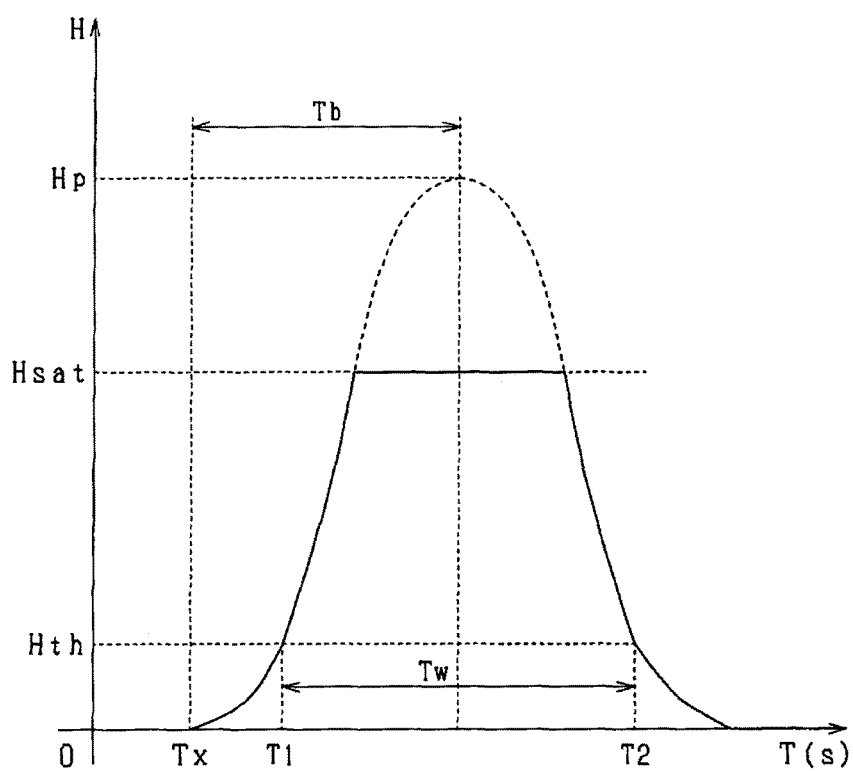
FIG. 12 is a view showing a calculation method of a wave height value in a fourth embodiment of the present disclosure.

FIG. 12 shows a waveform of a reflected wave when a wave height value Hp exceeds a detectable maximum value. FIG. 12 shows a case where a value of a wave height is outputted as an upper-limit value Hsat when the actual wave height exceeds the detectable upper-limit value Hsat.

A first time T1 when a wave height exceeds a threshold Hth and a second time T2 when the wave height falls below the threshold Hth are obtained to calculate a wave width value Tw indicating a time difference.

In FIG. 12, X axis represents time and Y axis represents a wave height, and a waveform of a reflected wave is represented on an X-Y coordinate system. A fact that a time from a reception start time Tx until a wave height reaches a maximum is equal to a transmission time period Tb exploited in the present embodiment. A first right triangle having vertices at a coordinate (Tx, 0), a coordinate (Tx+Tb, 0), and a coordinate (Tx+Tb, Hp), and a second right triangle having vertices at a coordinate (Tx, 0), a coordinate (T1, 0), and a coordinate (T1, Hth) can be drawn based on the waveform. The first right triangle and the second right triangle are of a similar figure. The first time T1 is also a value found by adding the transmission time period Tb to the transmission start time Tx and subtracting half of the wave width value Tw.

A ratio of two sides adjacent to a right angle is equal in the both right triangles. Hence, by using such a fact, a wave height value Hp is calculated in accordance with Equation (1) below using the threshold Hth and the transmission time period Tb, both of which are preliminarily determined values, and the wave width value Tw, which is a newly obtained value.

$$(Tb-Tw/2):Hth=Tb:Hp \qquad \text{Equation (1)}$$

With the configuration as above, the object detection device of the present embodiment achieves effects as follows.

For the process using a reflected wave, only the first time T1 when a wave height exceeds the threshold Hth is used generally. In contrast, the object detection devices of the first through third embodiments above perform process which requires a wave height value Hp in addition to the first time T1. In the present embodiment, even when a wave height value Hp exceeds the detectable upper-limit value Hsat, the value can be obtained by a computation. Hence, even in a case where a wave height value Hp of a reflected wave exceeds the detectable upper-limit value Hsat during the process of the first through third embodiments above, a height of an object can be determined.

(Modifications)

In the respective embodiments above, a wave height value is corrected according to a distance. However, a wave height value may be corrected according to a direction in which a reflected wave is received. A wave height value of a probing wave attenuates as an angle with respect to an orientation of the distance measuring sensor 10 increases. In other words, a wave height value of a wave reflected from an object not in the orientation of the distance measuring sensor 10 is smaller than a wave height value of a wave reflected from an object in the orientation of the distance measuring sensor 10. By taking such an attenuation into consideration, a reception direction of a reflected wave may be obtained to correct a wave height value according to the obtained direction. That is, the object detection device may further include a direction obtaining portion which obtains a reception direction of a reflected wave with respect to an orientation of a probing wave. In this configuration, the correction portion may correct a wave height value according to the reception direction.

In the second embodiment above, whether parallel parking is started is determined and normal process, which is the process of the first embodiment above, is performed when it is determined that parallel parking is not started. Likewise, in the third embodiment above, whether perpendicular parking is started may be determined, and normal process, which is the process of the first embodiment above, is performed when it is determined that perpendicular parking is not started. By taking such characteristics into consideration, the second embodiment and the third embodiment may be combined to perform process corresponding to parallel parking or perpendicular parking when either parallel parking or perpendicular parking is started and perform normal process of the first embodiment above when neither parallel parking nor perpendicular parking is started.

In the second embodiment above, the vehicle 30 is parked between the front vehicle 41a and the rear vehicle 41b. In the third embodiment above, the vehicle 30 is parked between the left vehicle 41c and the right vehicle 41d. It should be appreciated that both embodiments can be applied to a case where the vehicle 30 is parked between pillars or walls or between a pillar or a wall and another vehicle in a parking lot. In such a case, pillars and walls are objects having a linear portion and are therefore adopted as reference obstacles.

In the fourth embodiment above, a difference between the first time T1 when a wave height exceeds the threshold Hth and the second time T2 when the wave height falls below the threshold Hth is used as the wave width value Tw. Alternatively, a difference between a time point when a wave height value exceeds the upper-limit value Hsat and a time point when a wave height value falls below the upper-limit value Hsat may be also used as the wave width value Tw. In such a case, the upper-limit value Hsat is substituted for the threshold Hth in Equation (1) above.

The embodiments above have described a case where an ultrasonic wave is used as a probing wave as an example. Alternatively, waves other than an ultrasonic wave, for example, an acoustic wave or a radio wave may be used as a probing wave. In short, any wave oscillating in predetermined amplitude can be used as a probing wave.

In the respective embodiments above, the object detection device is equipped to the vehicle 30. Alternatively, the objection detection device may be equipped to mobile objects other than a vehicle, for example, an airplane, a boat, or a robot. Further, the object detection device may be equipped to a stationary object to measure a distance between the stationary object and an object near the stationary object because multiple reflection may possibly occur between the stationary object and a nearby object even when the object detection device is equipped to the stationary object. Furthermore, the object detection device may be put on an individual or carried around by an individual to notify the individual of approaching of a nearby object.

It is noted that a flowchart or the processing of the flowchart in the present disclosure includes portions (also referred to as steps), each of which is represented, for instance, as S101. Further, each portion can be divided into several sub-portions while several portions can be combined into a single portion. Furthermore, each of thus configured portions can be also referred to as a circuit, device, module, or means.

Each or any combination of portions explained in the above can be achieved as (i) a software portion in combination with a hardware unit (e.g., computer) or (ii) a hardware portion, including or not including a function of a related apparatus; furthermore, the hardware portion (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. An object detection device detecting an object using a distance measuring sensor equipped at a predetermined height, the object detection device transmitting a probing wave toward a periphery and receiving a reflected wave of the probing wave as detection information of the object, the object detection device comprising:
- a waveform obtaining portion obtaining a reception time and a wave height value of a wave reflected from the object, wherein the wave height value is defined as a value when a height of the wave reflected from the object reaches a maximum;
- a reference value calculation portion calculating a wave height value of a wave reflected from a reference obstacle as a reference value by using a wave height value obtained by the waveform obtaining portion, wherein the reference obstacle is present at least at the predetermined height;
- a detection value calculation portion calculating a wave height value of a wave reflected from a detection object as a detection value by using a wave height value obtained by the waveform obtaining portion, wherein the detection object is a detection target;
- a reference distance calculation portion calculating a distance between the reference obstacle and the distance measuring sensor as a reference distance by using a reception time of the wave reflected from the reference obstacle, wherein the reception time of the wave reflected from the reference obstacle is obtained by the waveform obtaining portion;
- a detection distance calculation portion calculating a distance between the detection object and the distance measuring sensor as a detection distance by using a reception time of the wave reflected from the detection object, wherein the reception time of the wave reflected from the detection object is obtained by the waveform obtaining portion;
- a correction portion correcting the reference value and the detection value according to an attenuation amount which varies in response to a distance ratio of the reference distance to the detection distance; and
- a height calculation portion calculating a height of the detection object relative to the predetermined height according to a relative comparison result of the reference value, which is corrected by the correction portion, and the detection value, which is corrected by the correction portion.

2. The object detection device according to claim 1, further comprising:
- a direction obtaining portion obtaining a reception direction of the wave reflected from the object with respect to an orientation of the probing wave,
- wherein the correction portion corrects the reference value and the detection value according to the reception direction.

3. The object detection device according to claim 1, wherein
- the reference value calculation portion calculates the reference value by using the object as the reference obstacle when the wave height value of the wave reflected from the object exceeds a predetermined threshold, and
- the wave height value of the wave reflected from the object is obtained by the waveform obtaining portion.

4. The object detection device according to claim 1, wherein
- the object detection device transmits a plurality of probing waves toward a plurality of the objects,
- the object detection device further comprises a grouping portion which groups one or more of the plurality of the objects when the one or more of the plurality of the objects have distances from the distance measuring sensor close to each other and have azimuths relative to the distance measuring sensor close to each other,
- the reference value calculation portion obtains an average value of wave height values of one or more reference obstacles grouped by the grouping portion as the reference value, and
- the detection value calculation portion obtains an average value of wave height values of one or more detection objects grouped by the grouping portion as the detection value.

5. The object detection device according to claim 4, wherein
- the reference value calculation portion obtains the average value by specifying a part of the plurality of the objects which are positioned at distances within a predetermined range from the distance measuring sensor as a group of the one or more reference obstacles.

6. The object detection device according to claim 1, wherein
- the object detection device is equipped to a vehicle, and
- the reference value calculation portion calculates the reference value by using the object having a height equal to or higher than the predetermined height and positioned close to the vehicle as the reference obstacle.

7. The object detection device according to claim 6, wherein,
- when the vehicle is parked between two objects having heights equal to or higher than the predetermined height and spaced from each other by a predetermined interval, the reference value calculation portion calculates the reference value by using one of the two objects having the height equal to or higher than the predetermined height as the reference obstacle.

8. The object detection device according to claim 6, wherein
- the object having the height equal to or higher than the predetermined height is another vehicle.

9. The object detection device according to claim 1, wherein
- an obtainable upper-limit is set with respect to the wave height value,
- the object detection device further comprises a wave height estimation portion which estimates the wave height value when the height of the wave exceeds the obtainable upper-limit, and
- the wave height estimation portion estimates the wave height value based on a predetermined threshold, a first time when the height of the wave exceeds the predetermined threshold, a second time when the height of the wave falls below the predetermined threshold, and a transmission time of the probing wave.

10. The object detection device according to claim 1, wherein
- the reference value calculation portion specifies the object having a linear portion extending in a horizontal direction as the reference obstacle.

* * * * *